COLOR INDEX

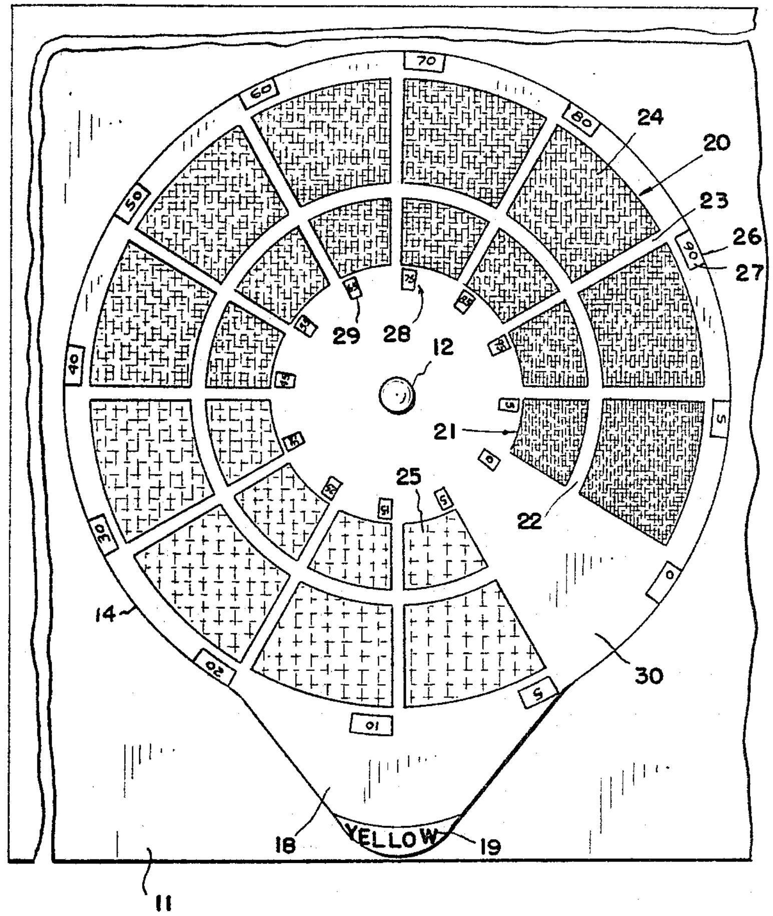
FIG. 1
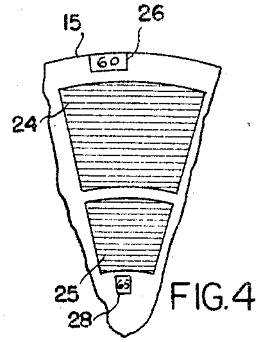
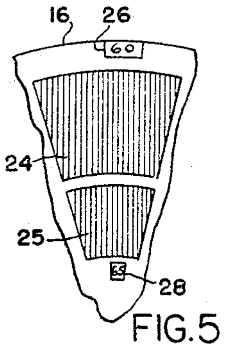
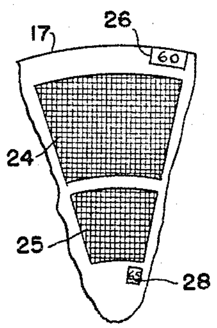
FIG. 6
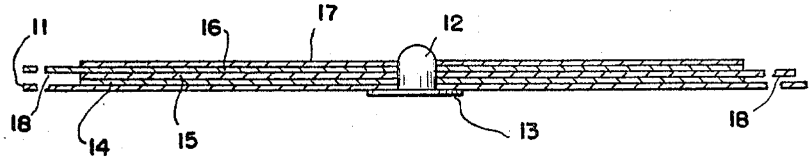
FIG. 3
INVENTOR.
WILLIAM STANISH
BY Cullen, Sloman & Cantor
ATTORNEYS Aug. 23, 1966 W. STANISH 3,267,589

Filed March 23, 1964 2 Sheets-Sheet 2

INVENTOR.
WILLIAM STANISH
BY Callan, Sloman & Cantor
ATTORNEYS

United States Patent Office 3,267,589

Patented August 23, 1966

3,267,589

COLOR INDEX

William Stanish, Temperance, Mich., assignor of one-third to Robert F. Fournier, Detroit, Mich., and one-third to Remi Tas, St. Clair Shores, Mich.

Filed Mar. 23, 1964, Ser. No. 353,877

4 Claims. (Cl. 35—28.5)

The present invention relates to a color index and primarily to a device for producing composite colors over a very wide range resulting from the visual combining of different color sectors of the same or different color density.

It is an object of the present invention to provide a color index by which a plurality of color discs, each of different colors, may be mounted upon a common pivot and wherein, each color disc is divided into a series of sectors of varying color density ranging progressively between zero and 100% and wherein, any pre-selected density of one color may be combined with any pre-selected density of one or more other colors to thus produce a composite color.

It is another object to provide a code indexing means upon each disc to designate the progressively changing color densities adapted to register with corresponding code indexing means of other color discs to provide a composite index number for any desired color produced by the combination of two or more discs for any pre-selected color density of any or all of said discs.

It is another object to provide a simplified color index wherein, many thousands of different colors may be produced quickly and to afford reproduction of said colors by being able to bring together the color sectors of the predetermined color densities within the range of zero to 100% to produce a particular color identified by a code number which is the composite of the individual code numbers.

These and other objects will be seen in the following specification and claims in conjunction with the appended drawings in which:

FIG. 1 is a fragmentary plan view of the present color index with a single color disc thereon for illustration.

FIG. 3 is a fragmentary section taken in the direction of arrows 3—3 of FIG. 2.

FIG. 4 is a fragmentary plan view of the blue color disc showing a pair of radially arranged color sectors of different density and with associated code numbers.

FIG. 5 is a similar view of a red color disc.

FIG. 6 is a similar view of a black color disc.

Figure 2:
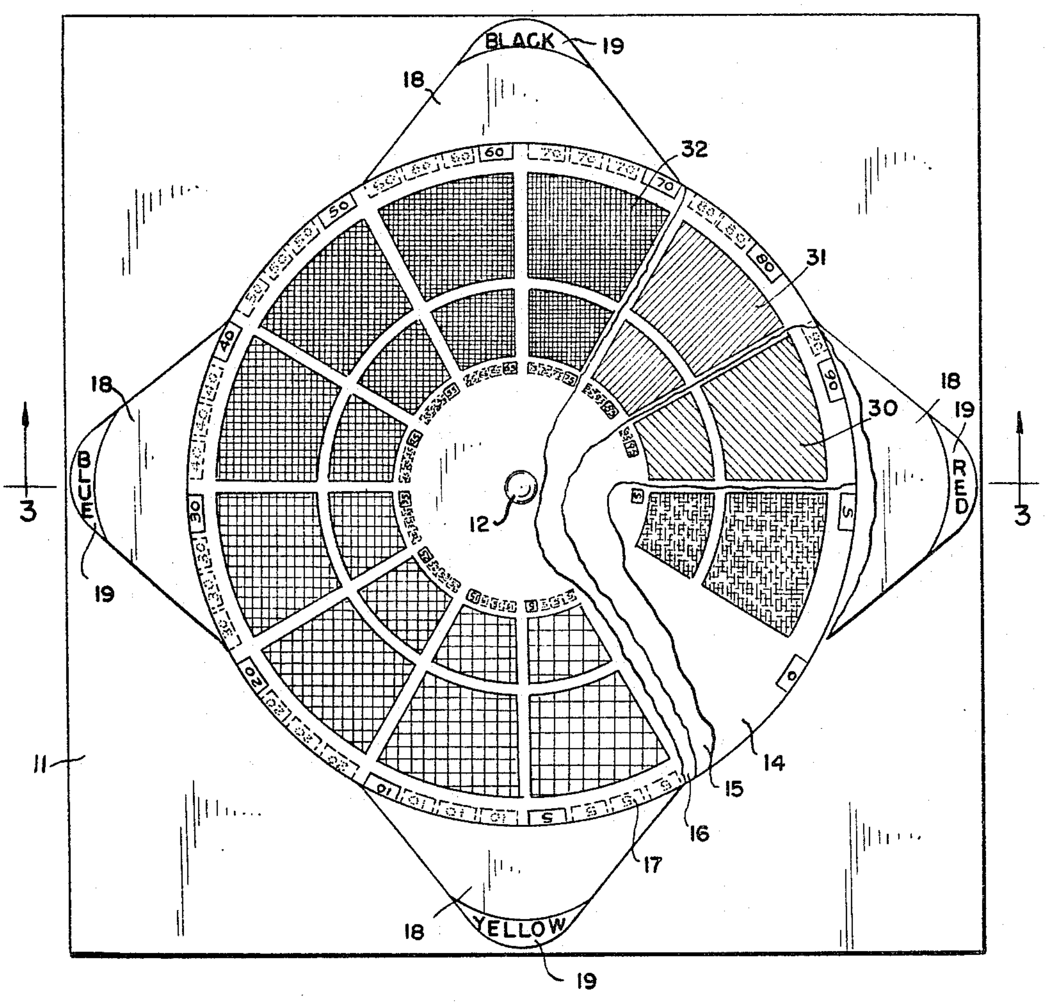
FIG. 2 is a fragmentary plan view of the color index with a series of color discs mounted thereon with some of the discs broken away for clarity of illustration and with the color sectors of the respective discs in registry for the production of composite colors.

It will be understood that the above drawings illustrate merely a preferred embodiment of the invention, and that other embodiments are contemplated within the scope of the claims hereafter set forth.

Referring to the drawings, the present color index includes a stiff base 11, preferably of cardboard or any other suitable material and preferably of a light color such as white for illustration. Upright pivot 12 projects up through base 11 and includes a flange 13 secured to said base. Pivot 12 provides a journal support for the yellow color disc 14, blue color disc 15, red color disc 16, and black color disc 17, all stacked thereon and adapted for relative rotation with respect to each other utilizing the individual radially extending tabs 18 which bear color designations 19, FIG. 2.

With the respective discs overlapped and with the sectors in registry, all of the same color density tabs 18 will be at 90 degrees from each other.

*Disc construction*

The yellow color disc 14, FIG. 1, mounted upon pivot 12, includes an outer series 20 of spaced radially extending color sectors 24 of varying color density of a first color spaced apart at 23. Each of the color sectors 24, lined for the color yellow, are of a different color density starting with zero, at 30, and as shown by the index code boxes 26 ranging between zero and 100%.

The outer series of said color sectors moving clockwise show progressively increasing color densities of 5%, 10%, 20%, 30%, and so on in 10 degree increments up to 100%, shown by the letter "S."

Disc 14 also has an inner series 21 of spaced radially extending color sectors 25 of varying color density of yellow which are spaced as at 22, radially inward of the outer series of color sectors and in respective radial alignment. These sectors 25, starting at zero, range progressively between 5%, 15%, 25%, 35%, and so on up to 100%, indicated by the letter "*s*" in code boxes 28.

Each of the color sectors 24 and 25 are of wedge shape, being radially arranged around the pivot portion of each disc and separated by the clear transparent portions 22 and 23.

Disc 14 is preferably constructed of a transparent substance, such as a plastic material polyethylene or the like. The various color sectors 24 and 25 are applied to the disc in layers and at the progressive color densities indicated by the percentage numerals in boxes 26 and 28.

A series of spaced numbered outer code boxes 26 are imprinted on the disc outwardly of the outer series of sectors and are arranged in a circle of a predetermined first radius. These boxes contain the numbers zero through 100%, the letter "S" indicating 100%. There is a 5% color gradation or density difference between the corresponding sectors 24 and 25 in radial alignment. For example, an 80% color density of yellow, as at 24 in FIG. 1, in outer series 20, corresponds to a color density of 85% in the inner series 21 of sectors 25.

A series of spaced numbered inner code boxes 28 are also imprinted upon the disc inwardly of the inner series of sectors, and are arranged in a circle of a predetermined second radius. Said code boxes are in radial alignment with corresponding sectors and having the numerical designations 29 ranging from zero to 100%, corresponding to the respective color densities of the individual inner series of sectors 25.

Each of the additional color discs are of the same shape and diameter as disc 14, such as blue color disc 15, red color disc 16, and black color disc 17, shown assembled and broken away in FIG. 2, and fragmentarily in FIGS. 4, 5, and 6. In FIG. 2, the color discs are broken away to show two or more color discs with their sectors in alignment to produce composite colors depending upon the color density of the superimposed color sectors.

Each of the additional color discs 15, 16, and 17, have an outer series 20 of spaced radially extending color sectors 24, corresponding to FIG. 1, of varying color density ranging progressively from 10% to 100% in 10% increments respectively of a second, a third, and a fourth color.

Each of the discs 15, 16, and 17, have an inner series 21 of spaced radially extending color sectors 24 of varying color density of the respective additional colors blue, red, and black. These sectors are spaced radially inward of the outer series of sectors and range progressively between 5% and 100% in 10% increments, also, and arranged in an inner circle.

The respective radially aligned sectors of the outer and inner series are at 5% color gradations therebetween, the same as described with respect to disc 14 of FIG. 1.

Each of the additional discs 15, 16, and 17, also has an outer series of spaced numbered code boxes 26 with numerical percentage designations 27 therein, from zero to 100%. Each of the additional discs 15, 16, and 17, also have the inner series of spaced numbered code boxes 28, also showing various numbering 29 from zero to 100%.

The difference, however, between the code boxes for the inner and outer series of color sectors for each disc is that said code boxes are laterally displaced between discs. Thus, when all of the discs are superimposed, FIG. 2, for each compound color produced by the overlying outer sectors 24, there will be four code boxes visible since the discs themselves are transparent. Similarly, the inner code boxes 28 will be arranged in an arcuate row with four visible code boxes.

Thus, there is provided by the combination of four discs, a color code number which consists of four numbers combined to thus produce a composite number like (20304010) corresponding to the composite color derived by the superimposition of four color sectors of predetermined density, i.e. yellow 20%, blue 30%, red 40%, and black 10%.

For example, in FIG. 2, four discs are overlapped, as for example, yellow, blue, red, and black, with the color densities of each being 70%. Thus, the composite code number for the color produced as at 32, for example, FIG. 2, is 70707070. The composite color produced by the registering inner sectors is identified by the code number 75757575. In the event that only three discs are employed, as for example, yellow, blue, and red, a composite color is produced as at 31, FIG. 2, such as some shade of brown designated by code number 808080 in the outer series of sectors, and in the inner series the composite different color coded 858585.

In the event that only two color discs are used, such as the yellow color disc 14 and the blue color disc 15, there will be produced various composite colors, such as at 30, namely a shade of the color green. Here the code number for the outer series is 9090 and the composite color produced by the overlying sectors of the inner series is 9595.

It is contemplated that any or all or some of the color discs can be rotated in 30 degree increments so that varying densities of one color will be in registry with other densities of another color, as for example, the code 055575 or any combination as desired, there being many thousands of color combinations possible to thus produce almost any conceivable composite color using two or more of said discs.

In the illustrative embodiment of the color discs shown are the colors yellow, blue, red, and black. Other color discs could be provided in a color index incorporating the present invention.

Having described my invention, reference should now be had to the following claims.

I claim:

1. In a color index having a base with an upright pivot;
a centrally apertured transparent first color disc on said base journaled on said pivot;
an outer series of spaced radially extending color sectors of varying color density of a first color ranging progressively from 10% to 100% in 10% increments arranged in an outer circle upon said disc;
an inner series of spaced radially extending color sectors of varying color density of said first color spaced radially inward of said outer series ranging progressively from 5% to 100% in 10% increments arranged in an inner circle upon said disc;
with the respective sectors of the outer and inner series being radially aligned and at 5% color graduations therebetween;
a series of spaced numbered outer code boxes imprinted on said disc outwardly of the outer series of sectors arranged in a circle of a predetermined first radius;

a series of spaced numbered code boxes imprinted on said disc inwardly of the inner series of sectors, arranged in a circle of a predetermined second radius;
said code boxes being in radial alignment with corresponding sectors respectively and having numerical designations corresponding to the color densities of the respective sectors;
each sector representing a layer pigment of pre-determined different color density;
a centrally apertured second color disc overlying said first color disc journaled on said pivot;
there being similar spaced outer and inner series of spaced radially aligned color sectors of varying color density of a second color of the same progressive color density ranges as in the first color disc, arranged in outer and inner circles corresponding to said first disc;
there being similar outer and inner series of numerically designated code boxes correspondingly imprinted on the second disc and located at said first and second coresponding radii;
the code boxes of one disc being laterally displaced from the code boxes of the other disc, whereby with any selected rotation of one disc relative to the other and with the corresponding sectors aligned between discs, there is visually produced at each sector location a composite color based upon the combination of overlying different color sectors of the same or different color densities; and
with the adjacent code boxes of the respective disc giving a composite index number for the adjacent composite color produced.

2. In the color index defined in claim 1, and radially extending tabs on the outer periphery of each disc to facilitate relative rotation thereof.

3. In the color index of claim 1, and a centrally apertured third color disc overlying said second color disc journaled on said pivot;
there being similar spaced outer and inner series of spaced radially aligned color sectors of varying color density of a third color of the same progressive color density ranges as in the first color disc, arranged in corresponding outer and inner circles;
there being similar outer and inner series of numerically designated code boxes correspondingly imprinted on the third disc and located at said first and second corresponding radii;
the code boxes of the third disc being laterally displaced from the code boxes of the other discs respectively, whereby with any selected rotation of the discs with respect to each other and with the corresponding sectors between discs aligned, there is visually produced at each sector location a composite color based upon the combination of overlying different color sectors of the same or different color densities, and with the adjacent code boxes of the respective discs visually providing a composite index number for the adjacent composite color selected and derived from the said discs.

4. In the color index of claim 3, each sector of each disc occuping 30 degrees of a circle and being wedge shaped;
said color discs being selected from the group consisting of the colors; yellow, blue, red, and black.

References Cited by the Examiner

UNITED STATES PATENTS

| | | | |
|---|---|---|---|
| 624,331 | 5/1899 | Henderson | 35—28.5 |
| 2,253,107 | 8/1941 | Brooks | 35—28.5 |
| 3,088,226 | 5/1963 | Watterson et al. | 35—28.3 |
| 3,088,227 | 5/1963 | Tudor | 35—28.5 |

EUGENE R. CAPOZIO, *Primary Examiner.*